Figure 1:
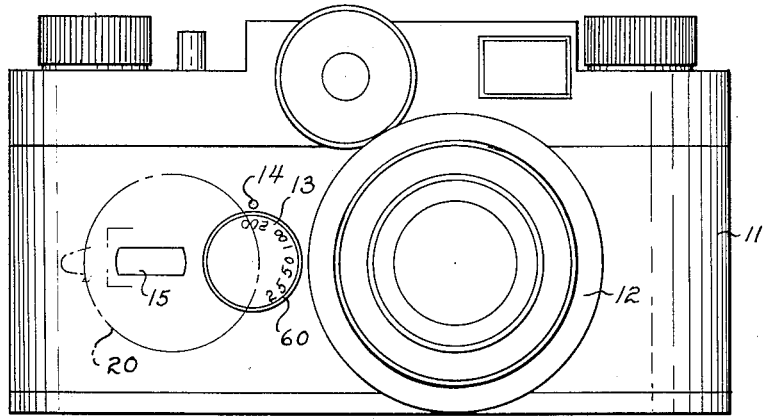

March 6, 1962     O. E. LIND, JR., ET AL     3,023,682
EXPOSURE METER AND CAMERA ATTACHMENT Filed June 10, 1957     3 Sheets-Sheet 1

INVENTOR
ORBIE E. LIND, JR.
CLARENCE HILLEGONDS

BY Strauch, Nolan + Neale

ATTORNEYS

March 6, 1962 O. E. LIND, JR., ETAL 3,023,682
EXPOSURE METER AND CAMERA ATTACHMENT
Filed June 10, 1957 3 Sheets-Sheet 2

INVENTOR
ORBIE E. LIND, JR.
CLARENCE HILLEGONDS
BY Strauch, Nolan + Neale
ATTORNEYS March 6, 1962 O. E. LIND, JR., ETAL 3,023,682
EXPOSURE METER AND CAMERA ATTACHMENT
Filed June 10, 1957 3 Sheets-Sheet 3
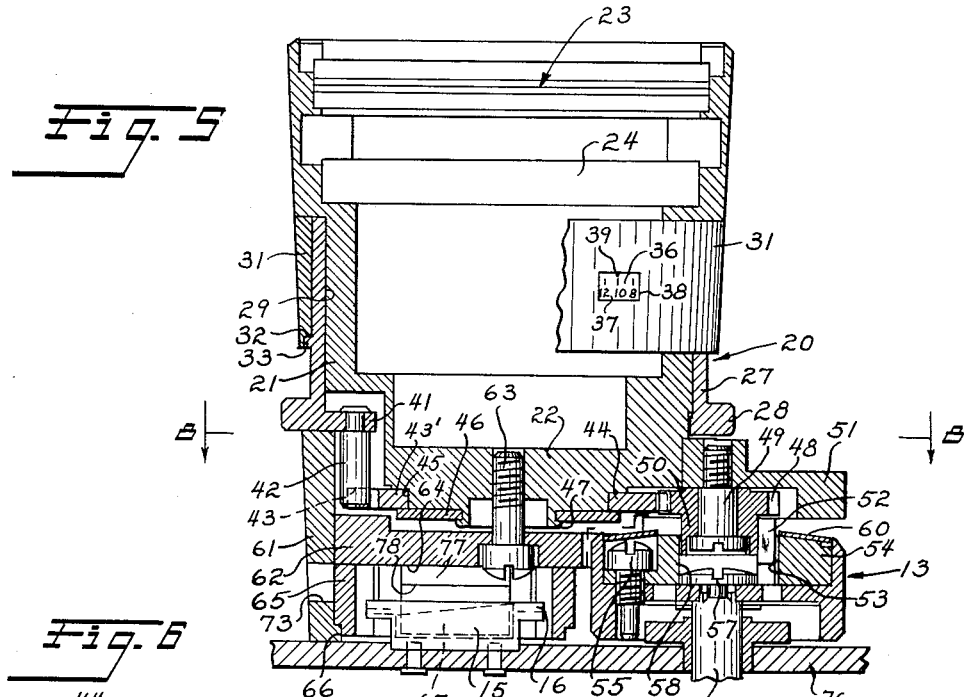
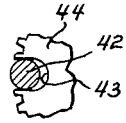
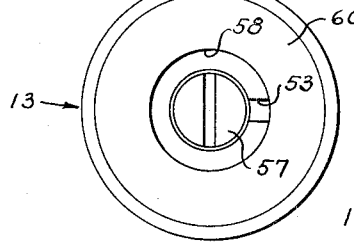
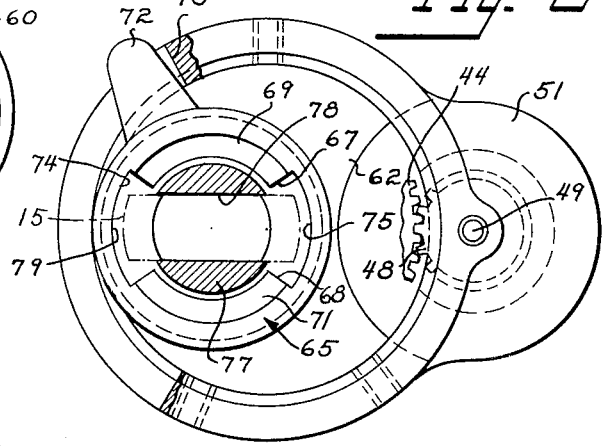
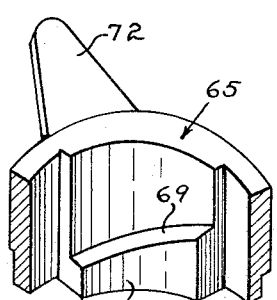
INVENTOR
ORBIE E. LIND, JR.
CLARENCE HILLEGONDS
BY Strauch, Nolan + Neale
ATTORNEYS United States Patent Office 3,023,682
Patented Mar. 6, 1962

3,023,682
EXPOSURE METER AND CAMERA ATTACHMENT
Orbie E. Lind, Jr., and Clarence Hilliegonds, Ann Arbor, Mich., assignors, by mesne assignments, to Sylvania Electric Products Company, Inc., Wilmington, Del., a corporation of Delaware
Filed June 10, 1957, Ser. No. 664,782
10 Claims. (Cl. 95—10)

This invention relates to the combination of a camera with an exposure meter and is particularly directed to the mounting of a more or less independent exposure meter upon a more or less conventional camera in such fashion as to properly and accurately couple, upon mounting, with an exposure regulating control of the camera.

Since the advent of the self-energizing photoelectric cell, the exposure meter art for cameras has developed widely, including suggestions for mounting or coupling the meter with the associated camera. Cameras with built-in photoelectric exposure meters and internal permanently coupled exposure controls are known. These require special internal camera structure and are usually expensive. Also clip-on mounts for independent exposure meters are known, with the camera controls free of coupling with the camera exposure controls, and here of course the camera serves only as a support for the exposure meter.

The present invention contemplates the mounting of an exposure meter, which is capable of use apart from the camera, on a camera in operatively coupled relation to an external exposure control of the camera. Such has been suggested generally as in the patents to Riepert No. 2,178,361 and Stein No. 2,630,049 but in those patents special coupling mechanism on the camera is provided, the need for which is avoided in the present invention.

It is therefore the major object of the invention to provide a novel manner of mounting an exposure meter on a camera and operatively coupling it to an adjustable exposure control of the camera.

A further object of the invention is to provide a novel releasable locking mechanism for readily and reliably detachably mounting an exposure meter on a camera.

It is still a further object of the invention to provide a novel coupling structure between a movable member of a photoelectric exposure meter and an exposure control member of a camera on which the meter is detachably mounted.

A further object is to provide a novel coupling arrangement between the adjustable external shutter speed control device of a camera and the corresponding adjustable element of a photoelectric exposure meter detachably mounted on the camera.

Figure 2:
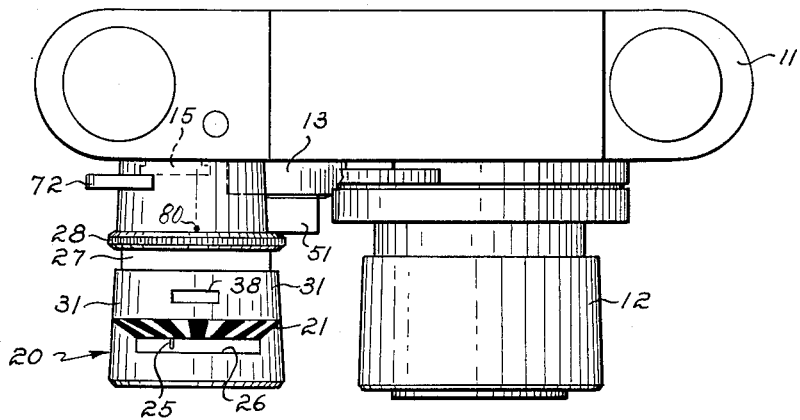
Figures 3, 4:
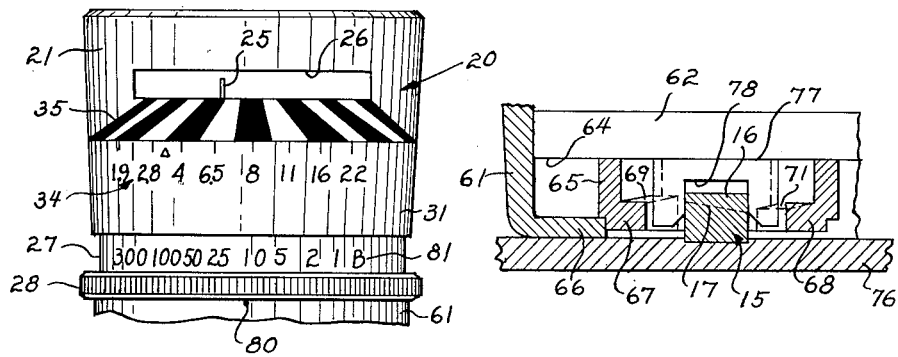
Figure 10:
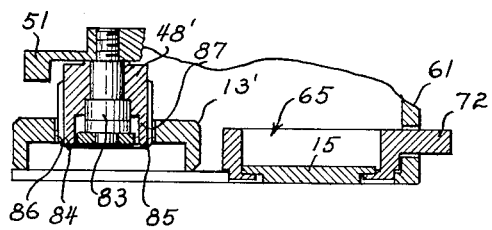
Figure 11:
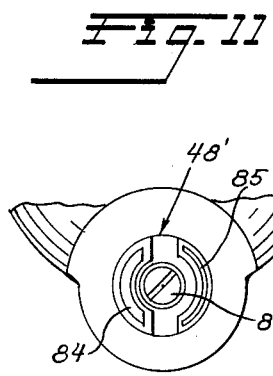

Other objects of the invention will presently appear as the description continues in connection with the appended claims and the annexed drawings wherein:

FIGURE 1 is a front elevation of a camera to which the invention is applicable;
FIGURE 2 is a top plan view of the camera showing the exposure meter in place for operation with the camera;
FIGURE 3 is a fragmentary top view of the exposure meter barrel showing the meter pointer and scale arrangement;
FIGURE 4 is a fragmentary partially sectioned end view of the lock bar and associated clamp structure;
FIGURE 5 is an axial section with parts broken away and in elevation showing the exposure meter and mount;
FIGURE 6 is a fragmentary view showing the pin and slot drive between the shutter speed scale member of the exposure meter and the gear train to the camera connection;
FIGURE 7 is a fragmentary view showing the spline connection between the gear of the exposure meter and the adapter on the shutter speed control knob of the camera;
FIGURE 8 is an end view of the exposure meter showing the camera end of the exposure meter;
FIGURE 9 is a fragmentary section in perspective showing the cam lock member on the exposure meter;
FIGURE 10 is a fragmentary elevation partly in section showing a different coupling between the output gear of the exposure meter and the shutter speed knob of the camera; and
FIGURE 11 is a fragmentary end view of the exposure meter connection of FIGURE 10.

The camera 11 has mounted on its front wall the objective lens assembly 12 and a rotatable shutter speed set knob 13 containing indicia coacting with a stationary index 14 on the wall.

According to the invention a photoelectric exposure meter is so mounted on the camera wall as to be accurately and positively coupled to the knob 13 in such fashion that setting movement of the shutter speed scale on the exposure meter will be correspondingly transmitted to the knob 13 and thereby automatically set the shutter speed in the camera in accord with the exposure meter setting.

A lock bar 15 is rigidly mounted on the front of the camera wall beside the knob 13. Preferably the bar 15 is so located substantially horizontal and with its longitudinal centerline intersecting the axis of knob 13 at right angles. At its opposite ends bar 15 has overhanging ledges 16 formed on their bottom surfaces with inclined cam faces 17 for a purpose to appear.

The exposure meter assembly 20 is mounted on the camera wall over lock bar 15. This assembly comprises a tubular casing 21 having an internal transverse wall 22. The casing is forwardly open and its front end is traversed by a light baffle asembly 23 of conventional structure disposed in front of a photoelectric cell 24 also of the conventional type that generates power proportional to incident light. Electrically connected to cell 24 in the casing is a milliammeter or like measuring device (not shown) that actuates a meter pointer 25 visible from above through a suitable window slot 26 shown in FIGURES 2 and 3.

A tubular shutter speed adjustment member 27 having a knurled rib 28 for manual turning is journalled on the cylindrical barrel 29 of casing 21. A diaphragm scale sleeve 31 is journalled on member 27, being retained against axial shift between shoulder 32 and a rib 33. The diaphragm scale 34 is circumferentially marked on sleeve 31 and connected by converging channel markings 35 with the edge of window 26 so that the position of pointer 25 may be readily traced to the scale 34.

The cylindrical outer surface 36 of member 27 is marked with a film speed scale 37 visible through a window 38 in sleeve 31, an index 39 being provided in the window.

At its rear end member 27 is formed with a rigid inwardly projecting radial lug 41 on which is fixed an axially projecting drive pin 42 that extends into a radial slot 43 formed in a gear 44 journalled on cylindrical casing boss 45 and axially retained between wall 22 and a retainer thrust plate 46 underlying a lip 47. The diameter of pin 42 is equal to the width of slot 43 so that all movement of pin 42 is transmitted to gear 43'.

A gear 48 meshed with gear 44 is journalled on an axially extending spindle 49 fixed on a laterally projecting casing ledge 51 which extends over the top of knob 13. A radial spline 52 on the hub 50 of gear 48 extends slidably into a correspondingly shaped axial slot 53 formed in a coupling member 54 that is seated in a recess in knob 13 and secured thereto as by screws 55. As illustrated knob 13 is fixed on the shutter speed control shaft 56 of the camera as by screw 57, and the cylindrical hub of gear 48 is essentially piloted into the cylindrical bore 58 of adapted 54. An annular scale plate 60 mounted on the adapted 54 carries the shutter speed markings and also conceals the heads of screws 55.

An essentially cup-shaped rear casing part 61 having an internal rigid ledge plate 62 is secured to casing 21 as by a screw 63. The rigid connection between ledge plate 62 and casing part 61 is not shown but may be any screw or like detachable fastener within the casing. The bottom surface 64 of ledge 62 is flat, smooth and perpendicular to the axis of the casing and forms a slide guide for the outer end of a rotatable lock collar 65 whose inner end is slidably rotatably supported over most of its periphery on the inturned casing end flange 66.

Collar 65 is formed with opposed inwardly projecting integral locking lugs 67 and 68 formed on their upper surfaces with inclined cam faces 69 and 71 respectively adapted to engage the inclined bottom faces 17 of the lock bar 15 when the collar 65 is rotated, and a handle 72 rigid with collar 65 projects through a slot 73 in casing member 61.

Sector shaped socket formations 74 and 75 are thereby provided in diametrally opposed relation in collar 65 and when the collar is properly rotated to align these with the open end of casing part 61 this permits the entire meter assembly 20 to be thrust axially onto the lock bar 15. Then handle 72 is manipulated to rotate collar 65 and this causes the cam surfaces 69, 71 to engage the cam faces 17 of the lock bar 15 and pull the meter casing into tight abutment with the camera front wall 76, thereby providing a strong widely based seating of the exposure meter on the camera.

Fixed upon the ledge 62 and rigidly depending therefrom is a bifurcated shoe 77 having a transverse slot 78. The width of slot 78 is such that in properly oriented position of the assembly 20 it aligns with and axially slides over lock bar 15 to thereby properly orient the entire exposure meter on the camera and prevent it from rotation about its axis with respect to the camera.

At the same time that the meter assembly is being axially thrust onto the lock bar 15, the spline 52 on gear 48 enters the slot 53 on the knob 13 to positively drive couple the adjustable shutter speed member of the meter to the shutter speed control shaft 56.

Referring to FIGURE 1 the lock bar 15 is located on the camera with its upper and lower parallel sides essentially horizontal. The exposure meter assembly with shoe slot 78 properly aligned is moved axially onto the camera, shoe 77 thereby embracing bar 15 and anchoring the exposure meter casing against any rotation on the camera. Then handle 72 of the cam lock collar 65 is rotated to clamp with the lock bar and tightly secure the casing of the exposure meter in stable relationship upon the front wall of the camera. The index 80 on the casing part 61 is also thereby made stationary with the camera.

The axial advance of the exposure meter 20 toward the camera will couple the hub of gear 48 to the shutter speed adjustment knob 13, but this can take place in only one relative position of the parts, where the spline 52 will enter slot 53 on the knob. The location of the shutter speed scale 81 on rotatable sleeve 27 with respect to stationary index 80 is always the same as the location of the shutter speed scale on rotatable knob 13 with respect to stationary index 14 on the camera, this being insured by properly circumferential location of spline 52 on the hub of gear 48. In other words when sleeve 27 is so adjusted that numeral 50 of scale 81 is opposite index 80, such locates spline 52 in a position where it will slide into slot 53 only when knob 13 has been rotated to position numeral 50 of scale 60 opposite index 14, and after such coupling the tubular member 27 and the knob 13 are positively locked for corresponding shutter speed adjustment, so that adjustment of member 27 will properly adjust shaft 56.

The mechanical detail of the interfitting parts on the knob 13 and gear 48 may vary but each such variation will retain the selective orientation feature above described, in one form or another.

In FIGURES 10 and 11 the coupling between the output gear 48' of the exposure meter which is connected to the shutter speed adjustment member as in the other embodiment and shutter speed adjustment knob 13' of the camera is somewhat different.

As shown in FIGURE 10 the gear 48' is mounted rotatably on spindle 83 and as shown in FIGURE 11 its hub is formed with diametrically opposite axially projecting flange sectors 84 and 85 of different thickness which in the assembly project into similarly shaped recesses 86 and 87 respectively in the web of knob 13'.

The parts are so related that the knob 13' which is marked with shutter speeds is turned until its 1/300 second scale marking which is at one extreme of the scale is opposite the associated index mark on the camera, rotation of the shutter speed adjustment element 27 of the exposure meter to line up the flange sectors of the gear with the associated knob recesses will locate the 300 mark on the scale 81 with index 80, and the parts are operatively interlocked as in the other embodiment.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An exposure meter of the type characterized by a photoelectric cell operably connected to an electric meter with both enclosed in a tubular casing and comprising a tubular member adjustable about the axis of said casing to indicate a camera exposure control value corresponding to measured light, a coupling part rotatably mounted on said casing on an axis parallel to the axis of said casing operably connected to be moved by adjustment of said member, socket means on said casing for detachably securing said exposure meter as a unit to a camera comprising a part recessed to fit with a fixed camera part only in a selected position of rotation of the casing about its axis and clamping mechanism mainly enclosed by the casing and formed to slidably coact with said fixed part on the camera received by the recess of the socket means to draw the casing axially tight against the camera part, and means on said coupling part for selective interlocking axially slidable connection with an exposure control device on said camera upon mounting the exposure meter on the camera so that adjustment of said member correspondingly adjusts said device.

2. In combination, a camera having a rigid lock bar on a wall thereof and a spaced rotatable shutter speed control knob, a photoelectric exposure meter unit having a quick detachable orientation coupling with said lock bar and a quick detachable drive connection to said knob said unit comprising an adjustable rotatable tubular member forming part of the meter exposure indicating scale, a rotatable transfer gear coupled to said member, a rotatable axially fixed coupling gear meshed with said transfer gear, and said drive connection comprising relatively axially slidable and interengaging elements on the knob and said coupling gear.

3. In combination an exposure meter unit having a member adjustably rotatable in accord with measured light values, a camera having a rotatable exposure control knob, means for mounting the meter unit on the camera and coacting projection and recess means on the member and knob which interfit in only predetermined relative positions thereof and which engage upon relative axial movement for operably connecting said member to control the camera shutter speed when said meter unit is mounted on the camera, said coacting recess and projection means comprising an axial recess in the knob having a slotted side wall and a radial spline on said member slidably fitting into said slot.

4. An exposure meter comprising a tubular casing open at one end to a chamber containing a photoelectric cell and an electric meter, a window in the side wall of said casing through which the pointer of said electric meter is visible, a tubular member rotatably mounted on said casing, said casing having an opening at the other end, and an axially fixed rotatable coupling member in the casing at said opening having a motion transmitting connection to said tubular member and an axially engageable camera shutter speed knob coupling formation a shutter speed scale on said tubular member coacting with a stationary index on said casing, a collar rotatably mounted on said tubular member, a diaphragm stop scale on said collar adjacent an edge of said casing, and scale markings radiating from the edge of said window to the edge of said casing adjacent the diaphragm stop scale.

5. In the exposure meter defined in claim 4, a film speed scale on the periphery of said tubular member, an aperture in said collar to expose said scale and an index for said scale on the collar at said aperture.

6. In combination, a camera having a rigid lock bar projection on a wall thereof, an exposure meter comprising a casing containing a light measuring device and a rearwardly open socket fitting over said bar, said socket comprising an opening of predetermined size and orientation for admitting said bar, a rotatable cam collar within the socket, said bar and collar having engaged surfaces for clamping said casing to said bar upon predetermined rotation of said collar, and an operating handle on said collar projecting through an aperture in said casing.

7. In the combination defined in claim 6, said bar having spaced inclined lock surfaces facing toward the camera, and said cam collar having inclined lock surfaces slidably engaged with said surfaces on the bar effective upon rotation of the collar to pull the casing and camera together tightly.

8. A camera having a front wall, an objective lens tube projecting from said wall, a shutter in the optical axis of said lens and a speed adjustment knob operably connected to said shutter and projecting from the front wall of the camera, a rigid lock bar on the front wall of said camera adjacent and in predetermined location with respect to said knob for detachably mounting an exposure meter projecting from said wall in the direction of said objective lens tube, a photoelectric cell unit detachably mounted on said camera wall, said unit having a rearwardly open socket recess fitting over said bar so that the entire unit is oriented by said lock bar, relatively rotatable coacting means on the unit for releasably axially clamping said unit to said lock bar, and means on said unit forming an axially engageable detachable drive connection between an adjustable exposure value indicating member on said unit and said knob.

9. In an exposure meter, a tubular casing containing a light measuring device and a forward light admission window, a shutter speed scale ring rotatably adjustably mounted on said casing, a first gear coaxial with said ring rotatably mounted within said casing, means for rotating said gear with said ring, an axially fixed transfer gear meshed with said first gear, said casing being open rearwardly of said transfer gear, a drive coupling on said transfer gear adapted to be operably connected to a rotatable shutter speed control member on a camera, and releasable means on said casing for clamping said casing to a camera and maintaining said drive coupling in operative association with the camera shutter speed control member comprising a rotatable cam collar within said rear casing opening.

10. In combination an exposure meter unit having a member adjustably rotatable in accord with measured light values, a camera having a rotatable exposure control knob, means for mounting the meter unit on the camera and coacting projection and recess means on the member and knob which interfit in only predetermined relative positions thereof and which engage upon relative axial movement for operably connecting said member to control the camera shutter speed when said meter unit is mounted on the camera, said coacting recess and projection means comprising spaced flanges of different size projecting axially from said member and spaced recesses of corresponding size on said knob.

References Cited in the file of this patent

UNITED STATES PATENTS

| | | |
|---|---|---|
| 1,859,621 | Fessenden | May 24, 1932 |
| 2,529,905 | Berssenbrugge | Nov. 14, 1950 |
| 2,553,656 | Kirby | May 22, 1951 |
| 2,630,049 | Stein | Mar. 3, 1953 |
| 2,766,654 | Stimson et al. | Oct. 16, 1956 |
| 2,803,162 | Norwood | Aug. 20, 1957 |
| 2,825,271 | McKae | Mar. 4, 1958 |
| 2,879,690 | Dunn | Mar. 31, 1959 |

FOREIGN PATENTS

| | | |
|---|---|---|
| 180,709 | Switzerland | Jan. 16, 1936 |

UNITED STATES PATENT OFFICE
CERTIFICATE OF CORRECTION

Patent No. 3,023,682                      March 6, 1962

Orbie E. Lind, Jr., et al.

It is hereby certified that error appears in the above numbered patent requiring correction and that the said Letters Patent should read as corrected below.

Column 3, lines 2 and 3, for "adapted", each occurrence, read -- adapter --; column 4, line 16, for "the" read -- when --; column 5, line 33, after "having" insert -- coacting --.

Signed and sealed this 20th day of November 1962.

(SEAL)
Attest:

ERNEST W. SWIDER                          DAVID L. LADD
Attesting Officer                           Commissioner of Patents